(12) United States Patent
Hisanobu et al.

(10) Patent No.: US 7,080,943 B2
(45) Date of Patent: Jul. 25, 2006

(54) SLIDE GUIDE DEVICE FOR PRESS

(75) Inventors: Kanamaru Hisanobu, Kanagawa (JP); Takao Ito, Kanagawa (JP)

(73) Assignee: Aida Engineering Co., Ltd., Sagamihara (JP)

( * ) Notice: Subject to any disclaimer, the term of this patent is extended or adjusted under 35 U.S.C. 154(b) by 18 days.

(21) Appl. No.: 10/341,534

(22) Filed: Jan. 13, 2003

(65) Prior Publication Data
US 2003/0217652 A1 Nov. 27, 2003

(30) Foreign Application Priority Data
Apr. 16, 2002 (JP) .............................. 2002-112937

(51) Int. Cl.
*F16C 29/12* (2006.01)

(52) U.S. Cl. .......................................... 384/38; 384/42

(58) Field of Classification Search .................. 384/42, 384/39, 40, 38, 41
See application file for complete search history.

(56) References Cited

U.S. PATENT DOCUMENTS 6,524,092 B1 * 2/2003 Ito et al. ........................ 384/42

FOREIGN PATENT DOCUMENTS

| DE | 43 06 396 A1 | 9/1994 |
|---|---|---|
| EP | 0 360 875 A1 | 4/1990 |
| EP | 1 050 401 A2 | 11/2000 |
| EP | 2000193782 | 5/2002 |
| JP | 2000-288666 | * 10/2000 |
| JP | 2000288799 A1 | 10/2000 |
| JP | 2002011600 A1 | 1/2002 |
| JP | 2000355350 | 5/2002 |

* cited by examiner

Primary Examiner—Lenard A. Footland
(74) Attorney, Agent, or Firm—Darby & Darby

(57) ABSTRACT

The present invention provides a slide guide for a press which comprises a gib structure with a spherical surface. The gibs are formed on a frame of the press. The spherical surface is provided with a holder or a cap to cover the spherical surface. The surface contacts are formed between the spherical surface bodies and the gibs or between the caps and the gibs. Forming spherical contact surfaces prevents damage to the sliding surface. This slide guide provides uniform, secure contact at a sliding surface of a press and prevents uneven contact. The spherical surface body can be easily installed and can adapt to deformation of the slide and prevent damage to the sliding surface.

11 Claims, 11 Drawing Sheets

SLIDE GUIDE DEVICE FOR PRESS

FIELD OF THE INVENTION

The present invention relates to a slide guide for a press. A slide guide is a device that guides a slide so that it can be raised and lowered in a precise manner.

BACKGROUND OF THE INVENTION

A conventional press includes a copper alloy liner adhered to a slide and an iron gib installed on the frame of the press. The slide is guided relative to the frame, while the liner and the gib slide against each other.

Lubricating oil is applied between the sliding surfaces of the liner and the gib. A clearance of approximately 0.05 mm is maintained between the liner and the gib. Uneven loading and the like may produce a line of contact between the liner and the gib, which may result in inadequate clearance and breaks in the oil film. This can damage the sliding surface and the main motor of the press.

It is particularly difficult to maintain proper clearance during precision pressing operations. Typical presses, such as two-point and four-point presses, handle larger slides by increasing the number of pressure-application points for applying eccentric loads. However, the dimensions of the crown, columns, bed, crank shaft, connecting rod, and the like must be precise in order to maintain levelness between the lower surface of the slide and the upper surface of the bolster. These components cannot be produced easily since they require a high level of precision. When the dimensions of these components are not sufficiently precise, a line of contact may form between the liner and the gib during operation under large eccentric loads.

Japanese patent application number 2000-193782 discloses a press in which a block with a spherical surface and a gib are interposed by a liner. The block and the gib can slide relative to each other via a V-shaped sliding surface. However, the V-shaped surfaces of the spherical-surface block and the gib are not easy to manufacture. The V-shaped surface on the spherical-surface block may spread apart under a large load, resulting in poor contact between the V-shaped surfaces. Japanese patent application number 2000-355350 discloses a device that is not affected by this problem.

SUMMARY OF THE INVENTION

The slide guide device of the present invention includes spherical surfaces that provide uniform, secure contact at the sliding surface and prevents uneven contact at the sliding surface.

A spherical surface body serves as a gib structure and is provided with a holder or a cap to cover the spherical surface body. The slide guide device comprises a gib, a spherical surface body, and a holder. The gib is disposed on a frame on the press. The spherical surface body is formed with a convex spherical surface and a flat surface that can slide against the gib. The holder is secured to a slide of the press and is formed with a concave spherical surface section that engages the convex spherical surface section of the spherical surface body. A pair of spherical surface bodies can be disposed on the slide, and the gibs corresponding to the spherical surface bodies can be positioned at an optimal angle which can be convex or concave. The holder can fit into a depression on the slide.

Alternatively, the slide guide device can comprise a gib, a cap, and a spherical surface body. The gib is disposed on a frame of the press. The cap is formed with a concave spherical surface and a flat surface that can slide against the gib. The spherical surface body is secured to the slide on the press and is formed with a convex spherical surface section which engages the concave spherical surface section of the cap. A pair of spherical surface bodies can be disposed on the slide of the press, and the gibs corresponding to the spherical surface bodies can be positioned at an optimal angle which can be convex or concave. The holder can fit into a depression on the slide.

The objects, features, and advantages of the present invention will become apparent from the following description read in conjunction with the accompanying drawings, in which like reference numerals designate the same elements.

LIST OF DESIGNATORS

1: frame; 2: slide; 3: bolster; 4: connecting rod; 5: gib; 6: gib; 6a: projection; 6b: engagement section; 7: spherical surface body; 8: spherical surface body; 9: spherical surface body; 10: spherical surface body; 11: liner; 12: wedge; 13: gib holder; 13a: engagement section; 14: gib holder; 14a: engagement section; 15: hollow screw; 16: bolt; 17: bolt; 18: cap; 19: stay; 23: shoe; 24: gib; 24a: projection; 25: gib; 26: bolt; 27: holder; 28: bolt; 31: bolt; 32: bolt; 33: gib

DETAILED DESCRIPTION OF THE PREFERRED EMBODIMENTS

Figure 1:
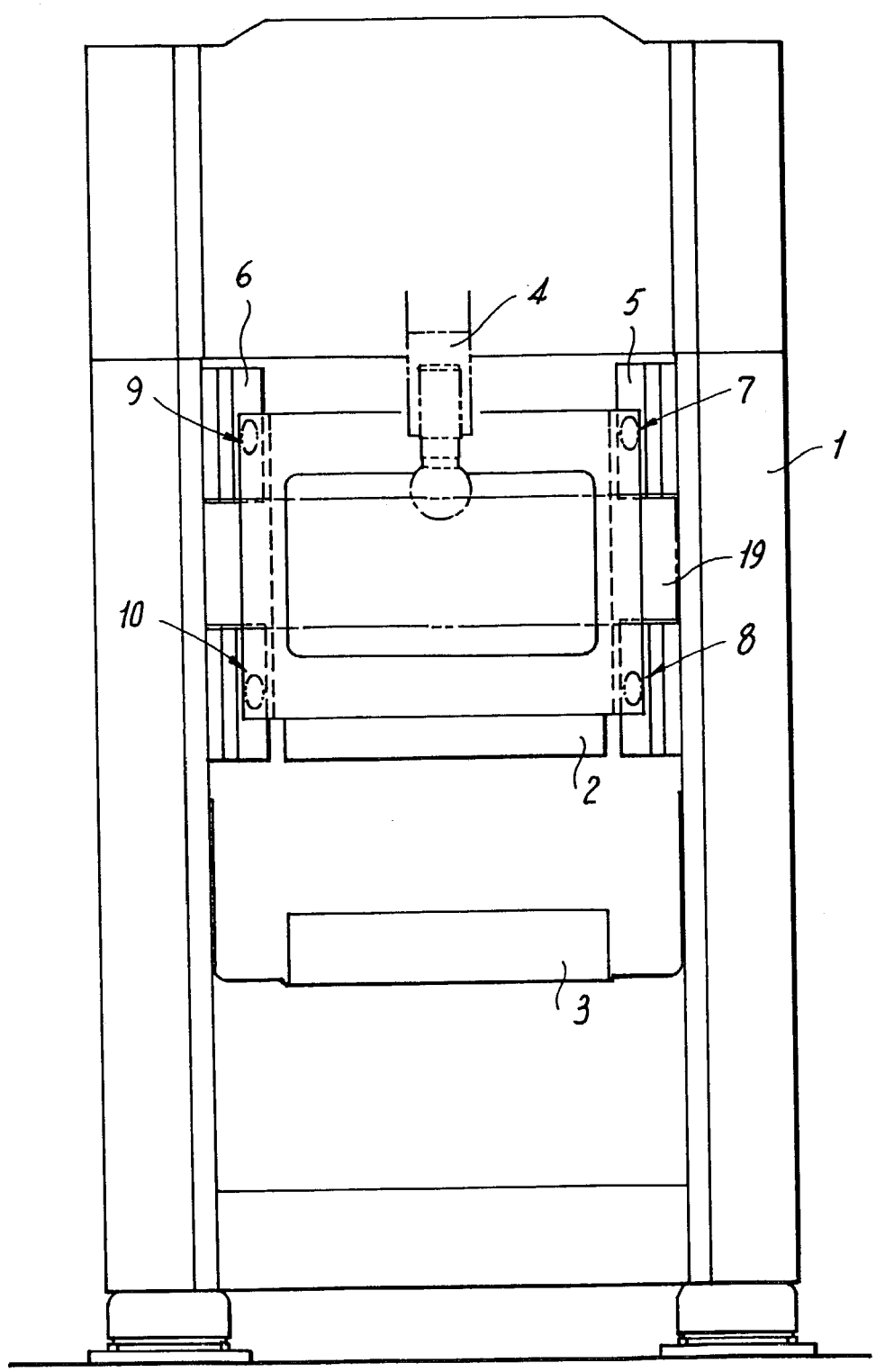
FIG. 1 is a front view of a press according to the present invention.
Figure 2:
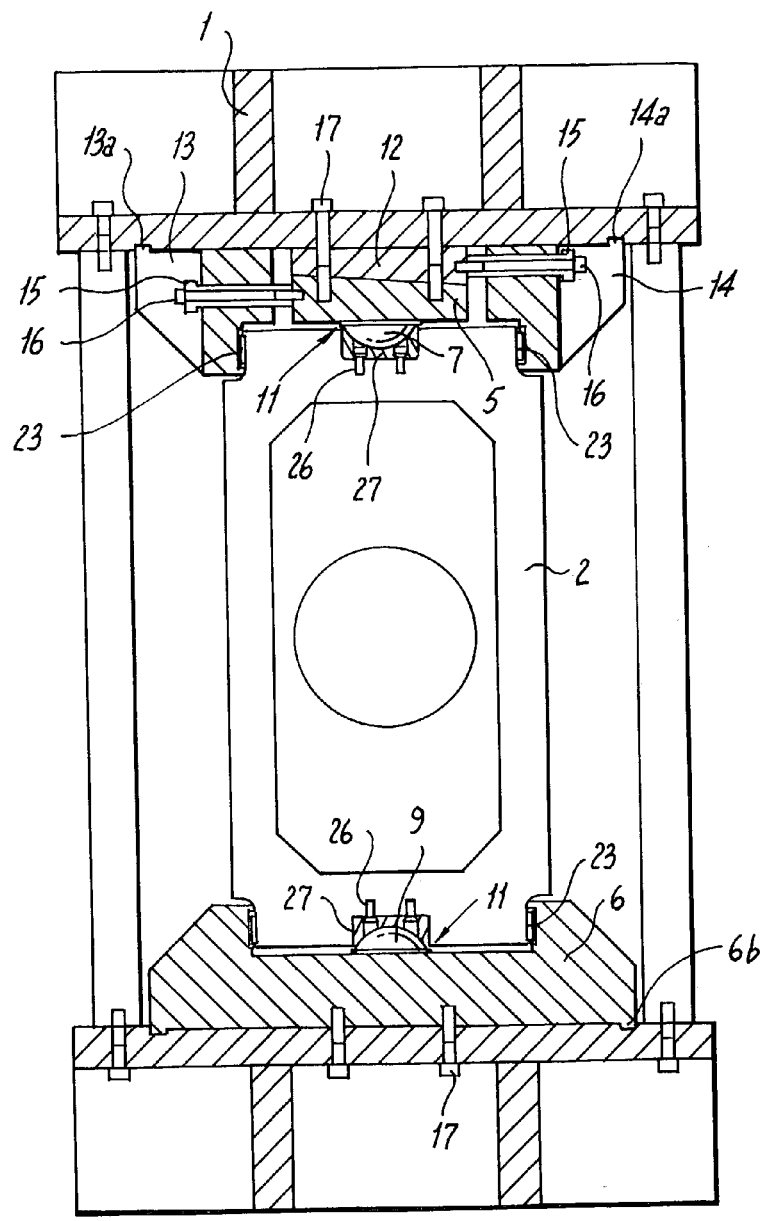
FIG. 2 is a lateral cross-section drawing of a gib in an embodiment of the present invention.

A press according to the present invention is shown in FIGS. 1 and 2. A bolster 3 is secured to the base of a frame 1, and a slide 2 faces the bolster 3. A crank mechanism comprises a crank shaft (not shown) and a connecting rod 4. The connecting rod 4 is connected to the slide 2, and the crank mechanism raises and lowers the slide 2.

A stay 19 extends between the left and right columns of the frame 1. The stay 19 restricts the displacement of the left and right columns and is located approximately at the midpoint of the vertical motion of the slide 2. The stay 19 prevents deformation and torsion of the frame 1. However, the stay 19 may be removed.

Gibs 5, 6 are disposed on the frame 1, and spherical surface bodies 7, 8, 9, 10 are disposed on the slide 2. The slide 2 is guided by the spherical surface bodies 7, 8, 9, 10 while the slide 2 is raised and lowered along the gibs 5, 6.

A cross-sectional view of the press through gibs 5, 6 is shown in FIG. 2. The drawing is rotated 90° counter-clockwise to facilitate the presentation. Gib holders 13, 14 are secured to the frame 1 using bolts or the like. Engagement units 13a, 14a formed on gib holders 13, 14 fit into grooves on the frame 1.

A hollow screw 15 with threads on the outer perimeter screws into a screw hole of gib holder 14. A bolt 16 secures the hollow screw 15 to gib holder 14. The end of bolt 16 is inserted into the hollow screw 15 and screws into the end of a wedge 12. The end of the hollow screw 15 pushes the wedge 12 and fixes the position of the wedge 12. The hollow screw 15 and bolt 16 align the wedge 12 relative to gib holder 14.

Gib 5 is aligned likewise relative to gib holder 13. Furthermore, the wedge 12 is tapered so that gib 5 can be moved forward and backward relative to the slide 2. Gib 5 and the wedge 12 are secured to the frame 1 with bolt 17 after gib 5 and the wedge 12 are aligned.

A sheet-like liner 11 is secured to gib 5 with a screw and is adhesed lengthwise along gib 5. However, the liner 11 can be removed so that spherical surface bodies 7, 9 slide directly against gibs 5, 6.

Spherical surface body 7 forms a section of a sphere and is disposed on the slide 2. The height of spherical surface body 7 is approximately 30% of the corresponding sphere. Spherical surface body 7 includes a convex spherical surface section and a flat section that can slide against the liner 11. A holder 27 is inserted between the slide 2 and spherical surface body 7. A bolt 26 secures the holder 27 to the slide 2, and the holder 27 can fit into a depression on the slide 2. The holder 27 includes a concave spherical surface section that engages with the convex spherical surface section of spherical surface body 7. Spherical surface body 7 can pivot while engaged with the holder 27.

The position of gib 5 can be adjusted, but the position of gib 6 is fixed. Gib 6 does not need to be adjustable since gib 5 can be adjusted. An engagement section 6b of gib 6 fits into a groove formed in the frame 1, and bolt 17 secures gib 6 to the frame 1. A spherical surface body 9 is disposed on the slide 2 in a similar manner to spherical surface body 7. Spherical surface body 9 and the structure to which it is attached is formed similarly to spherical surface body 7 and its corresponding structure.

Spherical surface body 7 is engaged with the holder 27. The holder 27 fits into the depression in the slide 2 and is secured to the slide 2 with bolt 26. Then, gib 6 is secured to the frame 1. Next, the wedge 12 and gib 5 are assembled. The hollow screw 15 and bolt 16 align the wedge 12 and gib 5 while preserving the contact between the liner 11 and a cap 18. Bolt 17 secures the wedge 12 and gib 5 to the frame 1.

A shoe 23 is adhesed to the slide 2. The shoe 23 contacts and slides against gib holders 13, 14 and the guide surface of gib 6. Spherical surface bodies 7, 9 can restrict the left and right movement of the slide 2, and the shoe 23 can restrict the front and back movement, as shown in FIG. 2.

Figure 3:
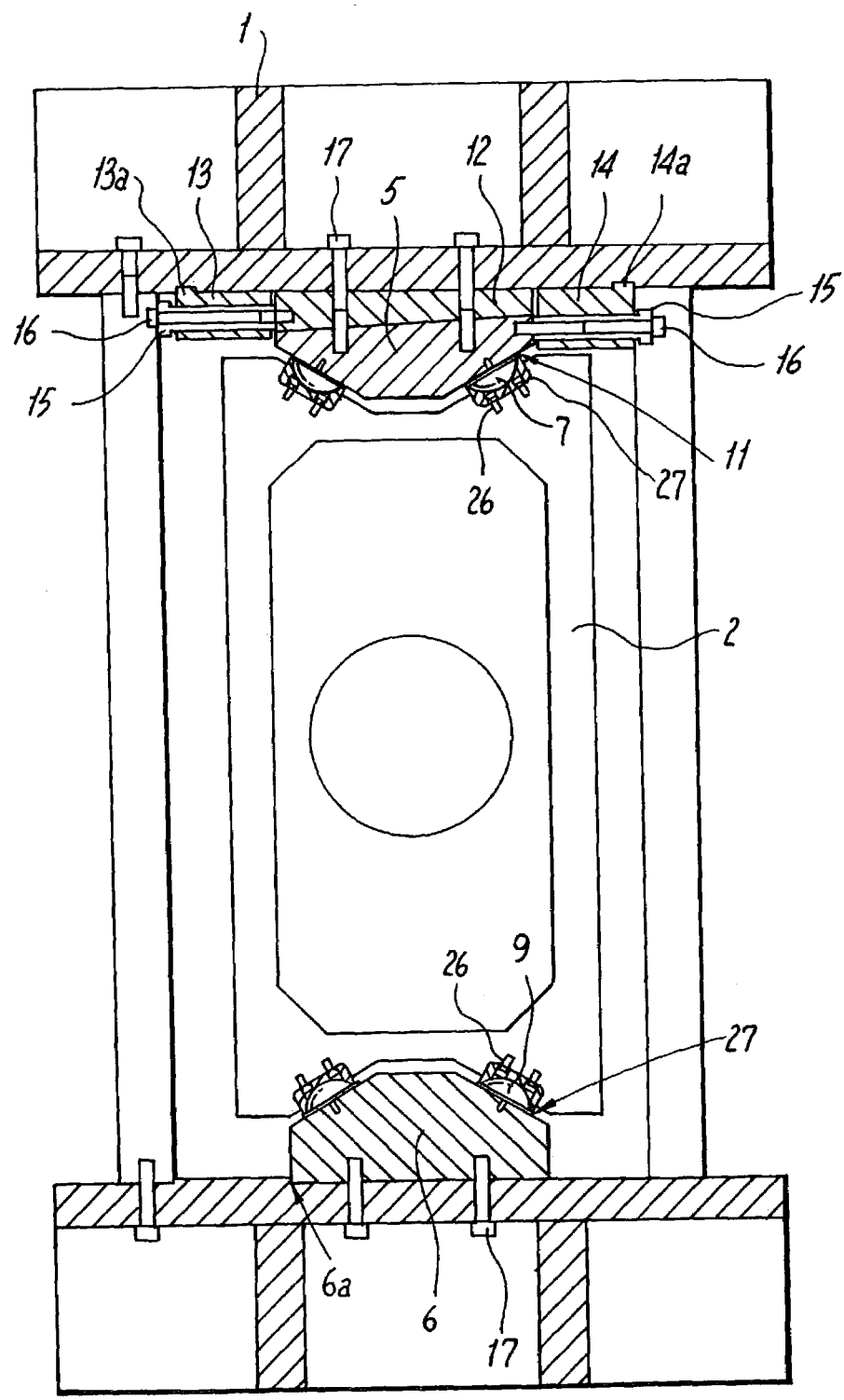
FIG. 3 is a lateral cross-section drawing of a gib in an alternate embodiment of the present invention.
Figure 4:
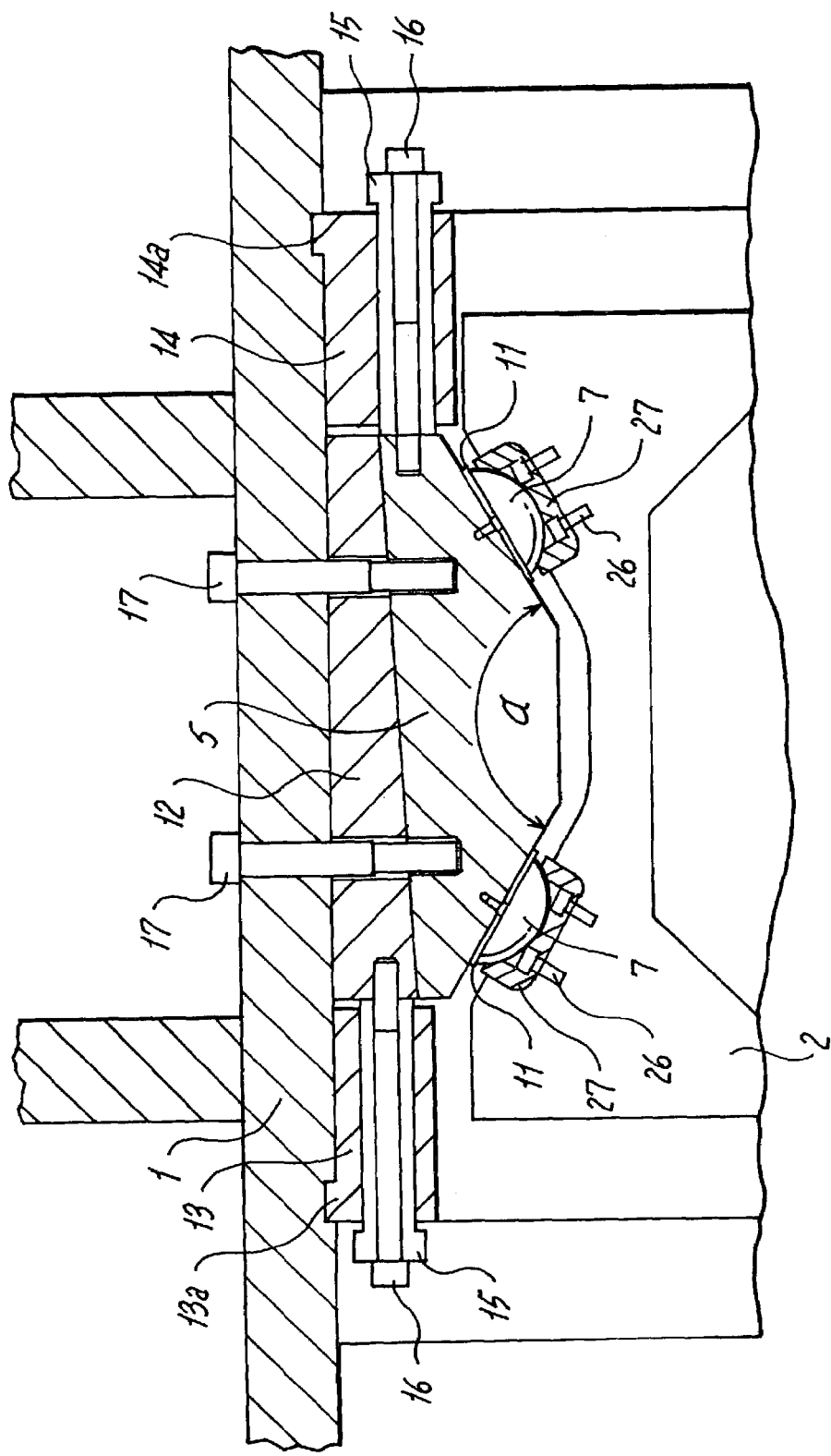
FIG. 4 is a detail drawing of a gib of FIG. 3.

FIGS. 3 and 4 show an alternate embodiment of the present invention. FIG. 3 is a lateral cross-sectional view of FIG. 1 along gibs 5, 6. The drawing is rotated 90° counter-clockwise to facilitate the presentation. FIG. 4 is a detailed view of the upper gib section of FIG. 3.

Gib holders 13, 14 are secured to the frame 1 using bolts (not shown). Engagement units 13a, 14a formed on gib holders 13, 14 fit into grooves on the frame 1.

The hollow screw 15 with threads on the outer perimeter screws into a screw hole of gib holder 13. Bolt 16 secures the hollow screw 15 to gib holder 13. The end of bolt 16 is inserted into the hollow screw 15 and screws into the end of the wedge 12. The end of the hollow screw 15 pushes the wedge 12, thereby fixing the position of the wedge 12. The hollow screw 15 and bolt 16 align the wedge 12 relative to gib holder 13.

Gib 5 is aligned relative to gib holder 14 in a similar manner. Furthermore, the wedge 12 is tapered so that gib 5 can be moved forward and backward relative to the slide 2. Gib 5 and the wedge 12 are secured to the frame 1 with bolt 17 after gib 5 and the wedge 12 are aligned.

The sheet-like liner 11 is secured to gib 5 with a screw and is adhesed lengthwise along gib 5. However, the liner 11 can be removed so that spherical surface bodies 7, 9 slide directly against gibs 5, 6.

Spherical surface body 7 forms a section of a sphere and is disposed on the slide 2. The height of spherical surface body 7 is approximately 30% of the corresponding sphere. Spherical surface body 7 includes a convex spherical surface section and a flat section that can slide against the liner 11. The holder 27 is inserted between the slide 2 and spherical surface body 7. Bolt 26 secures the holder 27 to the slide 2, and the holder 27 can fit into a depression on the slide 2. The holder 27 includes a concave spherical surface section that engages with the convex spherical surface section of spherical surface body 7. Spherical surface body 7 can pivot while engaged with the holder 27.

The position of gib 5 can be adjusted, but the position of gib 6 is fixed. Gib 6 does not need to be adjustable since gib 5 can be adjusted. Gib 6 abuts an abutting section 6a formed on the frame 1 and is secured to the frame 1 by bolt 17.

Spherical surface bodies 7, 9 are engaged with the holder 27. The holder 27 fits into the depression in the slide 2 and is secured to the slide 2 with bolt 26. Then, gib 6 is secured to the frame 1. Next, the wedge 12 and gib 5 are assembled. The hollow screw 15 and bolt 16 align the wedge 12 and gib 5 while preserving the contact between the liners 11 and the spherical surface bodies 7, 9. Bolt 17 secures the wedge 12 and gib 5 to the frame 1.

The liners 11 are adhesed to gibs 5, 6. The surfaces of the liners 11 are positioned to form an angle $\alpha$, as shown in FIG. 4. The holder 27 transfers pressure from the slide 2 to the contact surfaces of the liners 11 where the liners 11 contact the flat sections of the spherical surface bodies 7, 9.

The force applied to the contact surfaces can be considered as separate lateral and longitudinal forces that restrict the slide 2 since the contact surfaces are inclined. Therefore, the slide 2 is restricted both laterally and longitudinally by the gibs 5, 6. The angle $\alpha$ is approximately 120° and is determined from the status of the eccentric load of the press. The lateral projected area is larger than the longitudinal projected area when the lateral eccentric load is greater than the longitudinal eccentric load. When $\alpha$ is 120°, the projected area ratio between the lateral projected area and the longitudinal projected area is $\sqrt{3}:1$, i.e., approximately 1.7:1.

Figure 5:
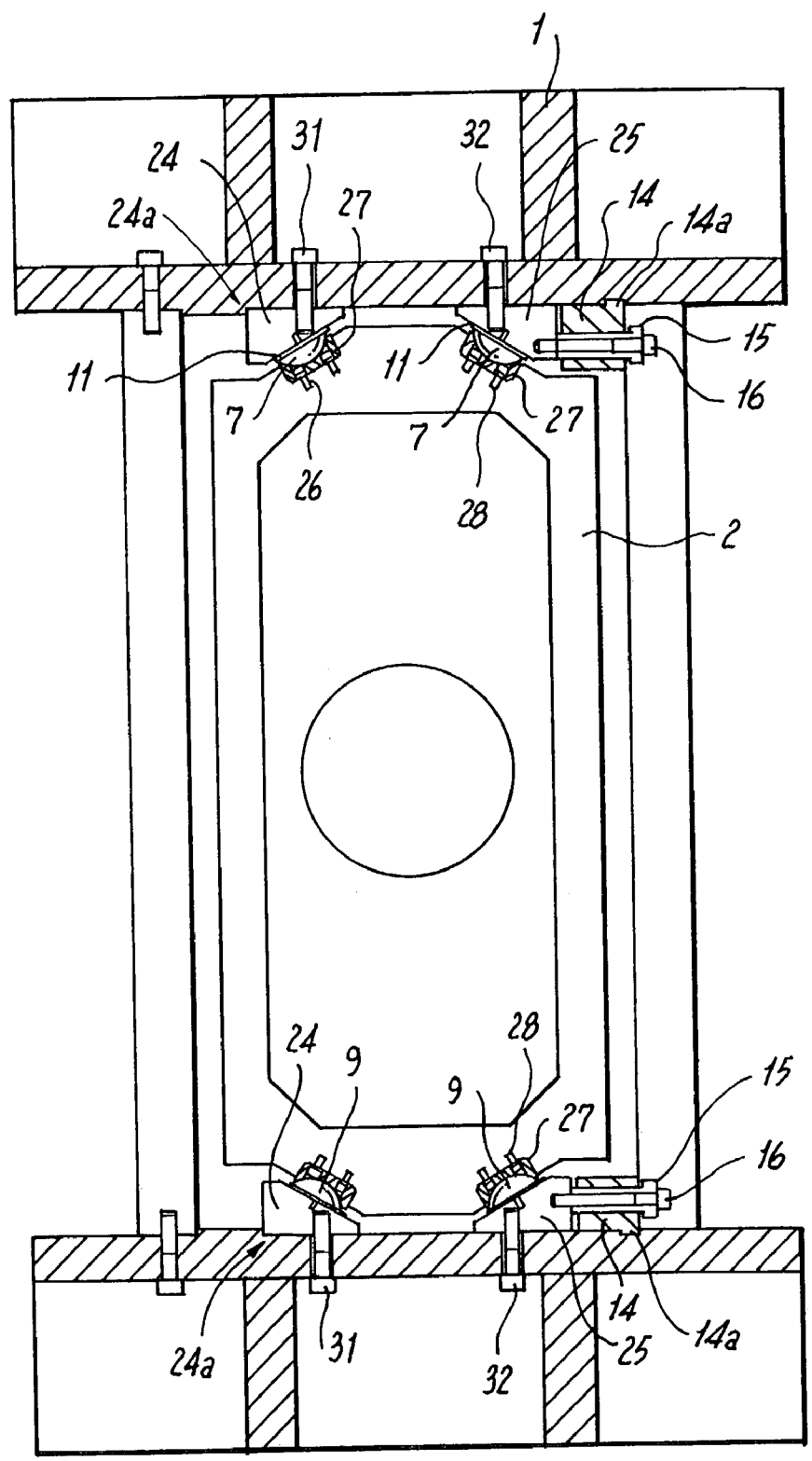
FIG. 5 is a lateral cross-section drawing of a gib in an alternate embodiment of the present invention.
Figure 6:
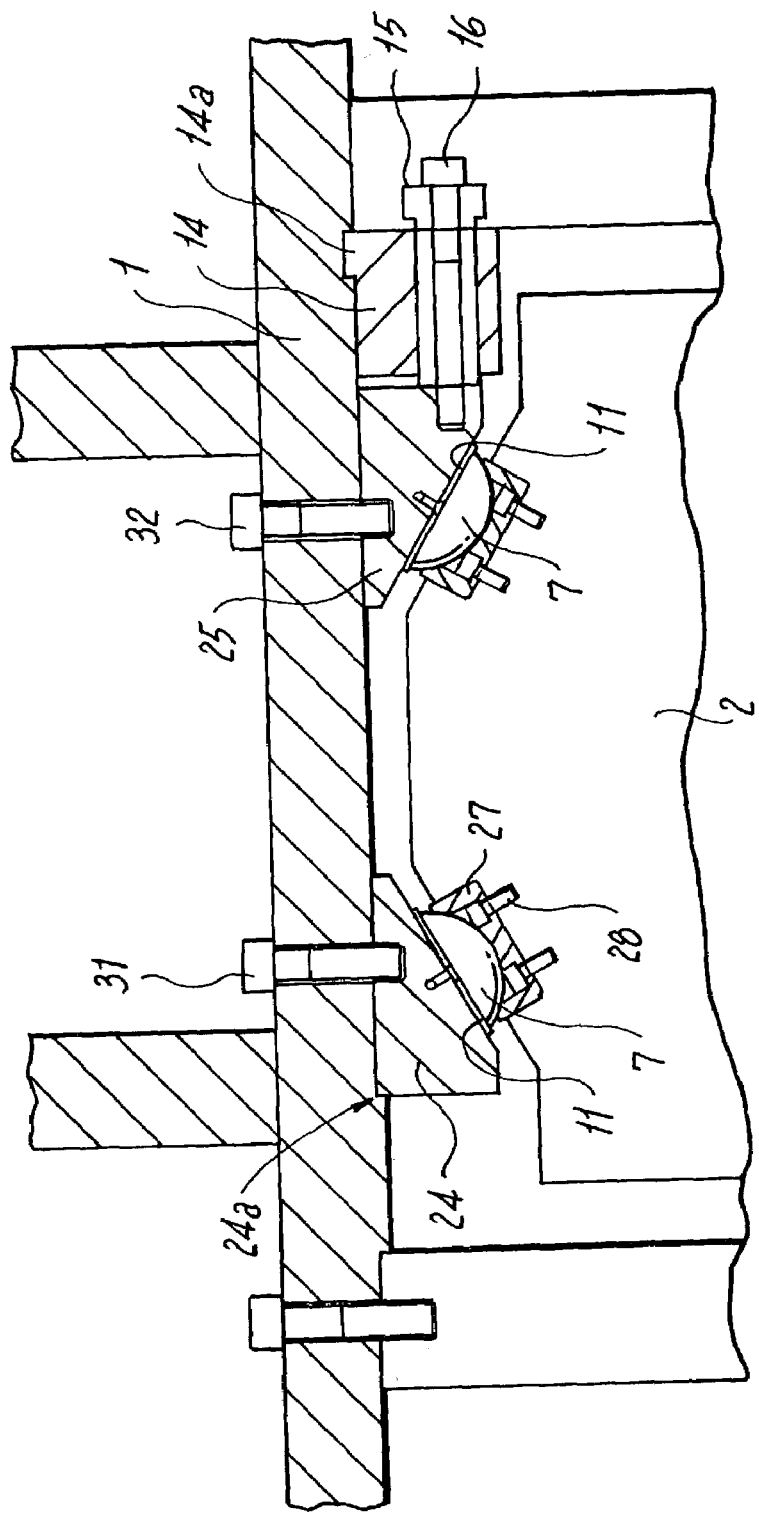
FIG. 6 is a detail drawing of a gib of FIG. 5.

FIGS. 5 and 6 show an alternate embodiment of the present invention. Spherical surface bodies 7, 9 are disposed on the slide 2 as described above.

Gibs 24, 25 and gib holder 14 are disposed on the frame 1. A projection 24a is formed on the frame 1 and abuts gib 24. A bolt 31 secures gib 24 to the frame 1. The structure of gib holder 14 is the same as that of the above-described embodiments. Gib holder 14 can be used to adjust the position of gib 25 which can be secured to the frame 1 with bolt 32.

FIG. 5 shows the liners 11, which serve as a pair of guide surfaces, positioned on the sliding surfaces so that they face toward the center of the slide 2. However, the sliding surfaces of the embodiment of the present invention shown in FIG. 3 face away from the slide, thereby allowing the structure to adjust to the effects of increasing temperature or the like in the slide 2. The slide 2 expands relative to gibs 24, 25 when the temperature of the slide 2 increases. However, the deformation of the slide 2 can be accommodated more easily when the sliding surfaces face away from the center of the slide 2 as in FIG. 3. Therefore, the liners 11 can be eliminated in the embodiment of the present invention shown in FIG. 3 so that spherical surface bodies 7, 9 and gibs 24, 25 slide directly against each other.

Figure 7:
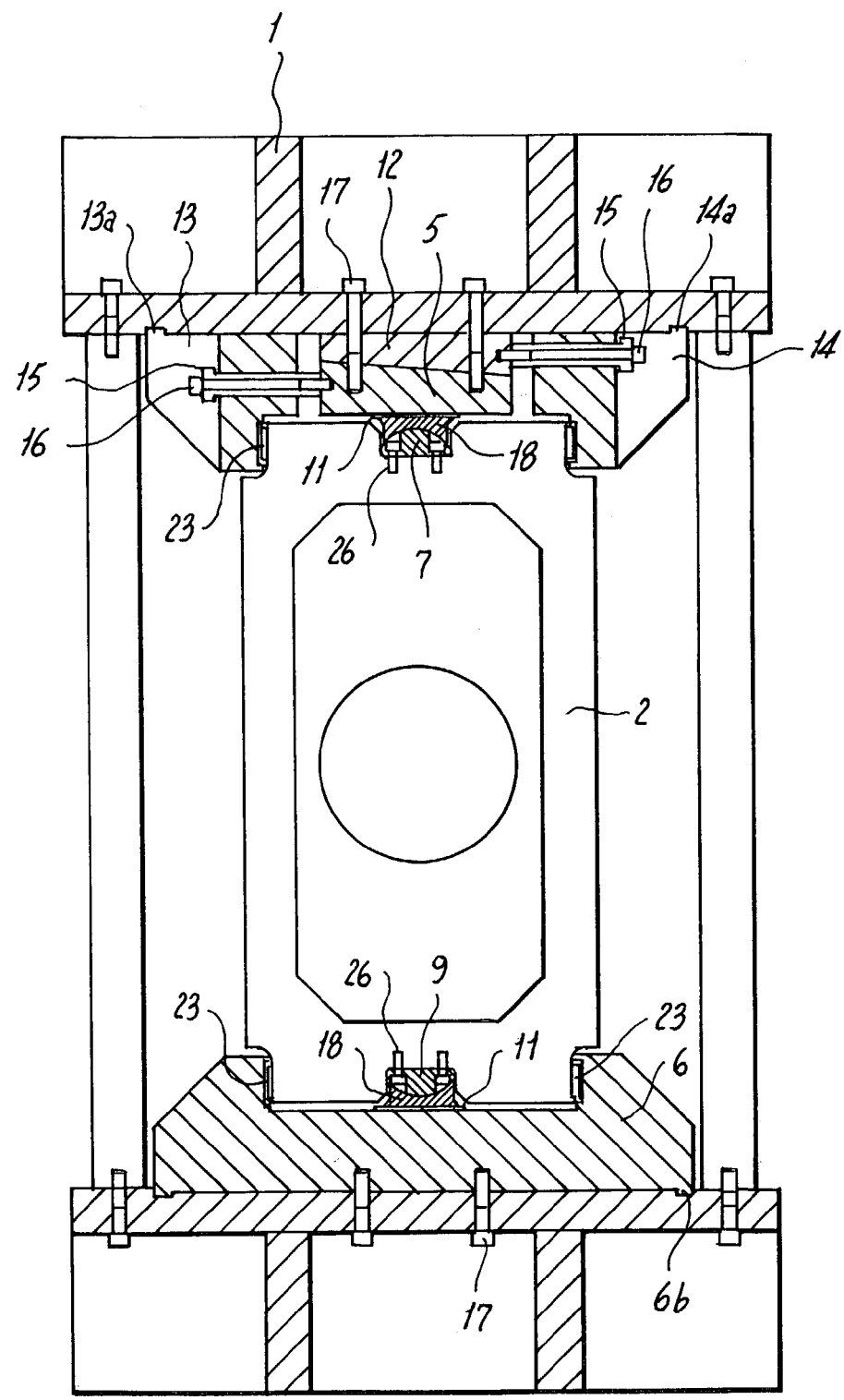
FIG. 7 is a lateral cross-section drawing of a gib in an alternate embodiment of the present invention.

FIG. 7 shows an alternate embodiment of the present invention that is similar to the embodiment shown in FIG. 2. However, spherical surface bodies 7, 9 are installed differently in these two embodiments.

FIG. 7 is a lateral cross-sectional view of FIG. 1 along gibs 5, 6. The drawing is rotated 90° counter-clockwise to facilitate the presentation. Gib holders 13, 14 are secured to the frame 1 with bolts (not shown). The engagement units 13a, 14a formed on gib holders 13, 14 are fitted to grooves on the frame 1.

The hollow screw 15 is screwed into gib holder 14 and is secured by bolt 16. The end of bolt 16 is inserted into the hollow screw 15 and screws into the end of the wedge 12. The end of the hollow screw 15 pushes the wedge 12, thereby fixing the position of the wedge 12. The hollow screw 15 and bolt 16 align the wedge 12 relative to gib holder 14.

Gib 5 is aligned relative to gib holder 13 in a similar manner. Furthermore, the wedge 12 is tapered so that gib 5 can be moved forward and backward relative to the slide 2. The wedge 12 and gib 5 are aligned and then secured to the frame 1 with bolt 17.

A screw secures the liner 11 to gib 5. The sheet-like liner 11 is adhesed lengthwise along gib 5. However, the liner 11 can be eliminated, and then, the cap 18 can slide directly against gibs 5, 6.

Bolt 26 secures spherical surface body 7 to the slide 2. Spherical surface body 7 fits into a depression formed on the slide 2. The cap 18 includes a concave spherical surface section and is inserted between spherical surface body 7 and the liner 11. The concave spherical surface section of the cap 18 engages with the convex spherical surface section of spherical surface body 7 so that the cap 18 can pivot within the spherical surface of spherical surface body 7. Additionally, the cap 18 includes a flat section, and this flat section and the liner 11 can slide against each other.

The position of gib 5 can be adjusted, but the position of gib 6 is fixed. Gib 6 does not need to be adjustable since gib 5 can be adjusted. The engagement section 6b of gib 6 fits into a groove formed in the frame 1, and bolt 17 secures gib 6 to the frame 1.

The caps 18 engage with the spherical surface bodies 7, 9. Spherical surface bodies 7, 9 fit into depressions in the slide 2 and are secured to the slide 2 with bolt 26. Then, gib 6 is secured to the frame 1. Next, the wedge 12 and gib 5 are installed. The positioning of gib 5 is adjusted with the hollow screw 15, bolt 16, and the wedge 12 while preserving the contact between the liner 11 and the cap 18. Bolt 17 secures the wedge 12 and gib 5 to the frame 1.

The shoe 23 is adhesed to the slide 2. The shoe 23 contacts and slides against gib holders 13, 14 and the guide surface of gib 6. The caps 18 restrict the left and right movement of the slide 2, and the shoe 23 restricts the forward and backward movement of the slide 2.

Figure 8:
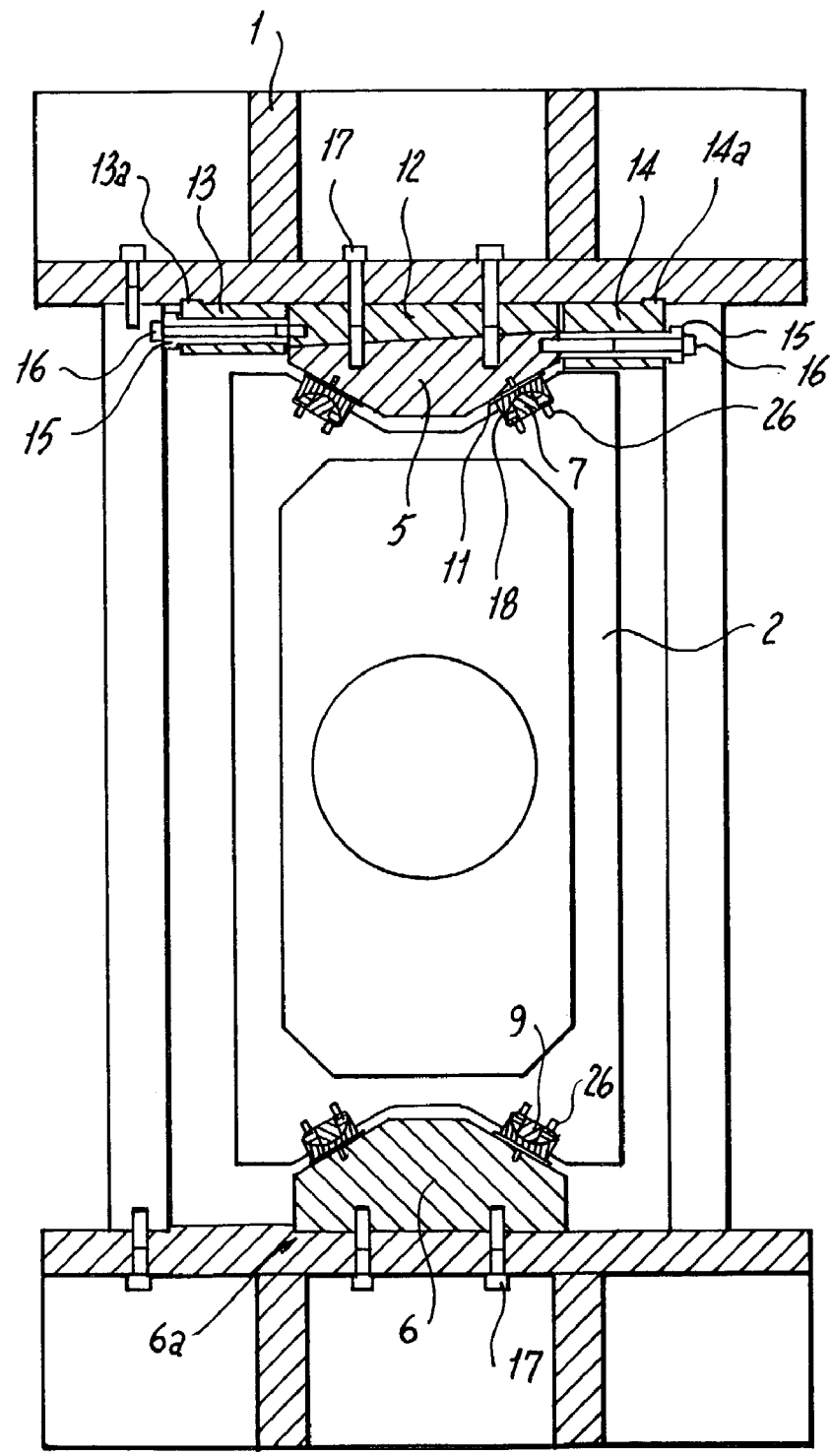
FIG. 8 is a lateral cross-section drawing of a gib in an alternate embodiment of the present invention.
Figure 9:
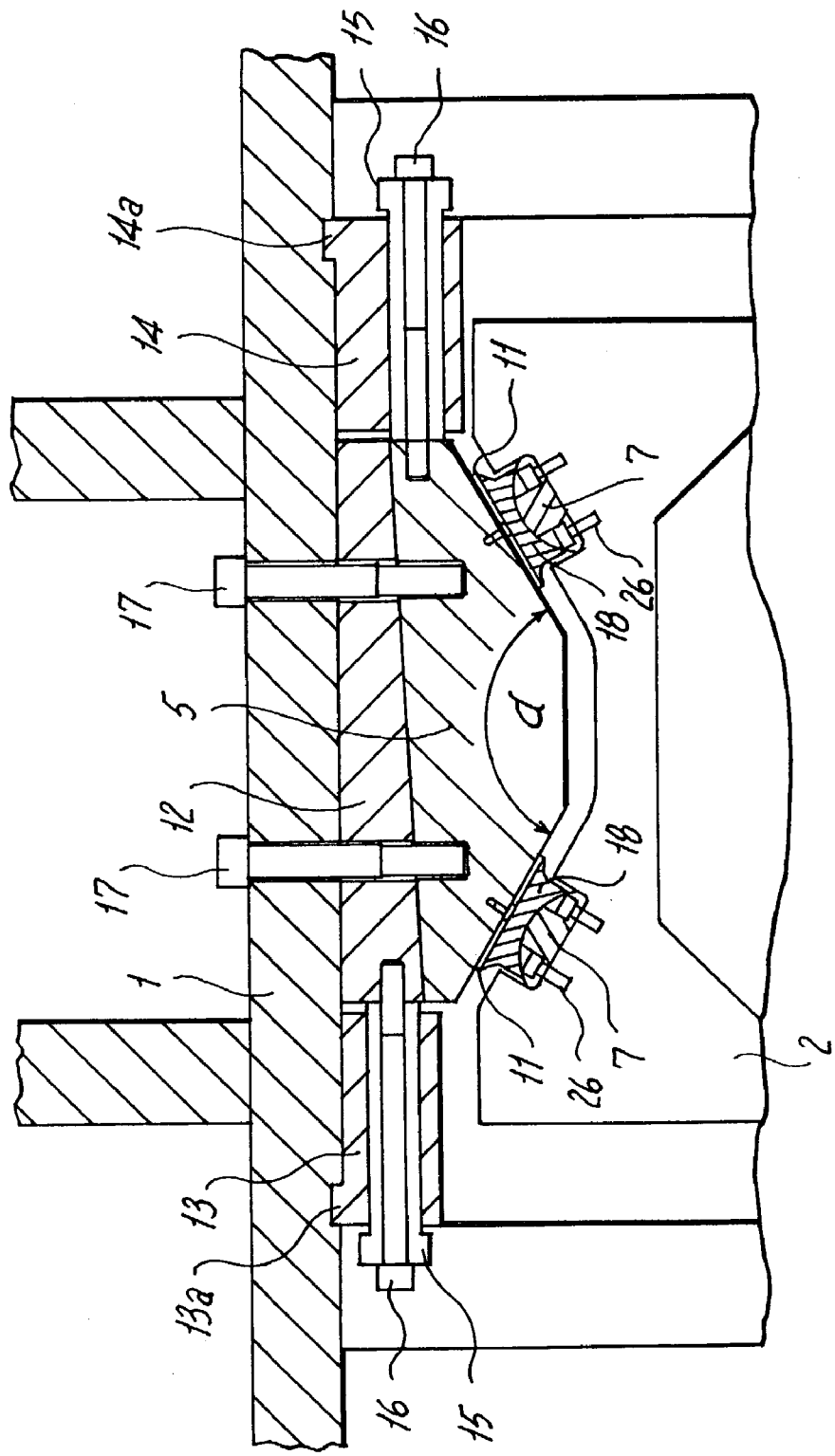
FIG. 9 is a detail drawing of a gib of FIG. 8.

FIGS. 8 and 9 show an embodiment of the present invention that is similar to the embodiment shown in FIGS. 3 and 4. However, the spherical surface bodies 7, 9 are installed differently in the two embodiments.

FIG. 8 is a lateral cross-sectional view of FIG. 1 along gibs 5, 6. The drawing is rotated 90° counter-clockwise to facilitate the presentation. FIG. 9 is a detailed view of the upper gib section of FIG. 8.

Gib holders 13, 14 are secured to the frame 1 with bolts (not shown). The engagement units 13a, 14a formed on gib holders 13, 14 are fitted into grooves on the frame 1.

The hollow screw 15 screws into gib holder 13 and is secured by bolt 16. The end of bolt 16 is inserted into the hollow screw 15 and screws into the end of the wedge 12. The end of the hollow screw 15 pushes the wedge 12, thereby fixing the position of the wedge 12. The hollow screw 15 and bolt 16 align the wedge 12 relative to gib holder 13.

Gib 5 is aligned relative to gib holder 14 in a similar manner. Furthermore, the wedge 12 is tapered so that gib 5 can be moved forward and backward relative to the slide 2. Gib 5 and the wedge 12 are secured to the frame 1 with the bolt 17 after gib 5 and the wedge 12 are aligned.

The sheet-like liner 11 is secured to gib 5 with a screw and is adhesed lengthwise along gib 5. However, the liner 11 can be removed so that spherical surface bodies 7, 9 slide directly against gibs 5, 6.

Bolt 26 secures spherical surface body 7 to the slide 2. Spherical surface body 7 can fit into the depression on the slide 2. The cap 18 has a concave spherical surface section and is inserted between spherical surface body 7 and the liner 11. The concave spherical surface section of the cap 18 engages with the convex spherical surface section of spherical surface body 7 so that the cap 18 can pivot along the spherical surface of spherical surface body 7. The cap 18 also includes a flat section, and this flat section and the liner 11 can slide against each other.

The position of gib 5 can be adjusted, but the position of gib 6 is fixed. Gib 6 does not need to be adjustable since gib 5 can be adjusted. Gib 6 abuts an abutting section 6a formed on the frame 1 and is secured to the frame 1 by bolt 17.

The caps 18 engage with spherical surface bodies 7, 9. Spherical surface bodies 7, 9 can fit into the depressions in the slide 2 and are secured to the slide 2 with bolt 26. Then, gib 6 is secured to the frame 1. Next, the wedge 12 and gib 5 are installed. The positioning of gib 5 and the wedge 12 is adjusted with the hollow screws 15 and bolt 16 while preserving the contact between the liner 11 and the cap 18. Bolt 17 secures the wedge 12 and gib 5 to the frame 1.

The surfaces of the liners 11 are adhesed to gibs 5, 6 and are positioned to form an angle $\alpha$ as shown in FIG. 9. Spherical surface body 7 and the cap 18 transfer pressure from the slide 2 to the section of the surface of the liner 11 that contacts the flat section of the cap 18.

The force applied to the contact surfaces can be considered as separate lateral and longitudinal forces that restrict the slide 2 since the contact surfaces are inclined. Therefore, the slide 2 is restricted both laterally and longitudinally by the gibs 5, 6. The angle $\alpha$ is approximately 120° and is determined from the status of the eccentric load of the press. The lateral projected area is larger than the longitudinal projected area when the lateral eccentric load is greater than the longitudinal eccentric load. When $\alpha$ is 120°, the projected area ratio between the lateral projected area and the longitudinal projected area is $\sqrt{3}:1$, i.e., approximately 1.7:1.

Figure 10:
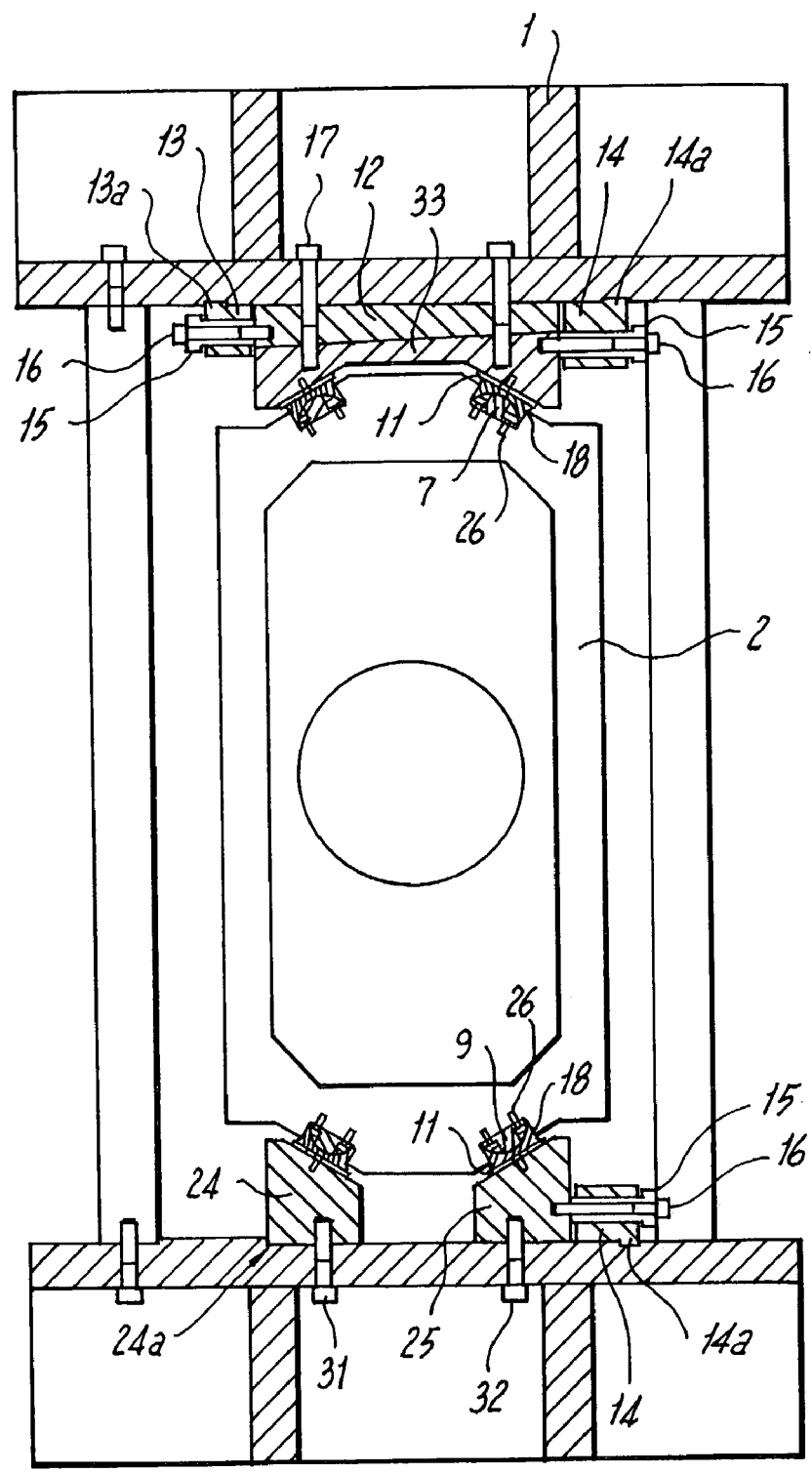
FIG. 10 is a lateral cross-section drawing of a gib in an alternate embodiment of the present invention.
Figure 11:
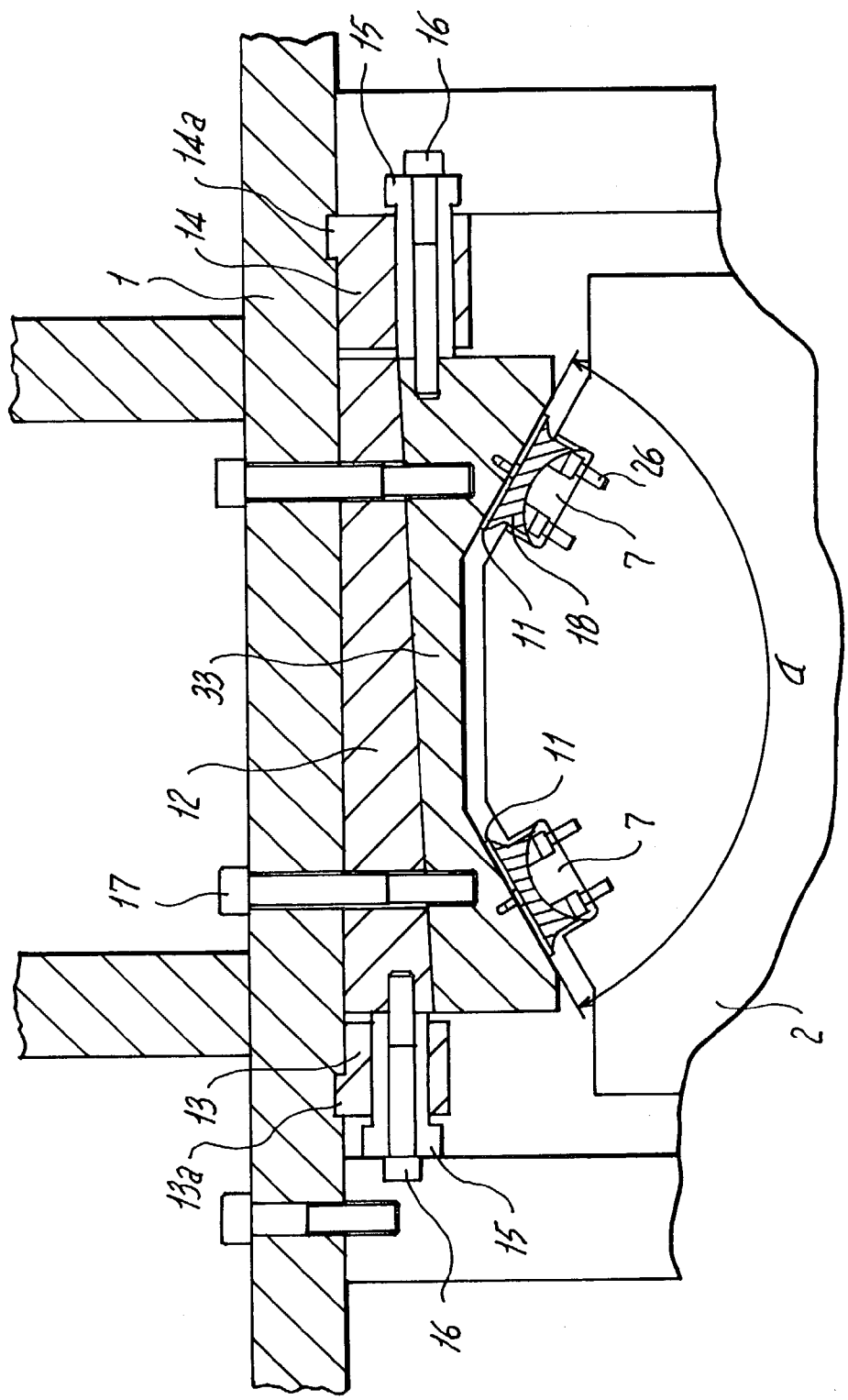
FIG. 11 is a detail drawing of a gib of FIG. 10.

FIGS. 10 and 11 show an alternate embodiment of the present invention that is similar to the embodiment shown in FIGS. 5 and 6. However, the structure of the gibs and the method of installing the spherical surface bodies 7, 9 are different between the two embodiments.

The slide 2 is concave and gibs 5, 6 are convex in the embodiment of the present invention shown in FIGS. 8 and 9. However, the slide 2 is convex and gibs 24, 25, 33 are concave in the embodiment shown in FIGS. 10 and 11. The concave and convex shapes of the slide 2 and the gibs are reversed between these two embodiments. The angle α is 120° between the pair of liners 11 in the embodiment shown in FIGS. 10 and 11, which is similar to the embodiment shown in FIGS. 5 and 6.

FIG. 10 is a lateral cross-sectional view of FIG. 1 along the gibs. The drawing is rotated 90° counter-clockwise to facilitate the presentation. FIG. 11 is a detailed view of the upper gib section of FIG. 10.

Gib holders 13, 14 are secured to the frame 1 using bolts (not shown). The engagement units 13a, 14a formed on gib holders 13, 14 are fitted into grooves on the frame 1.

The hollow screw 15 with threads on the outer perimeter screws into a screw hole of gib holder 13. Bolt 16 secures the hollow screw 15 to gib holder 13. The end of bolt 16 is inserted into the hollow screw 15 and is screwed into the end of the wedge 12. The end of the hollow screw 15 pushes the wedge 12, thereby fixing the position of the wedge 12. The hollow screw 15 and bolt 16 align the wedge 12 relative to gib holder 13.

Gib 33 is aligned likewise relative to gib holder 14. Furthermore, the wedge 12 is tapered so that gib 33 can be moved forward and backward relative to the slide 2. Gib 33 and the wedge 12 are secured to the frame 1 with bolt 17 after gib 33 and the wedge 12 are aligned.

The sheet-like liner 11 is secured to gib 33 with a screw and is adhesed lengthwise along gib 33. However, the liner 11 can be removed so that spherical surface bodies 7, 9 slide directly against gibs 24, 25, 33.

Bolt 26 secures spherical surface body 7 to the slide 2. Spherical surface body 7 fits into a depression on the slide 2. The cap 18 is formed with a concave spherical surface section and is inserted between spherical surface body 7 and the liner 11. The concave spherical surface section of the cap 18 engages with the convex spherical surface section of spherical surface body 7. The cap 18 can pivot while engaged with the spherical surface of spherical surface body 7. Additionally, the cap 18 is formed with a flat section, and the flat section and the liner 11 can slide against each other.

The position of gib 33 can be adjusted, but the position of gibs 24, 25 are fixed. Gibs 24, 25 do not need to be adjustable since gib 33 can be adjusted.

Gib 24 abuts against the projection 24a formed on the frame 1 and is secured to the frame 1 with the bolt 31. The configuration of gib holder 14, the hollow screw 15, bolt 16 are the same as those described above. These components are used to adjust the position of gib 25, and then, bolt 32 secures gib 25 to the frame 1.

The cap 18 engages with spherical surface bodies 7, 9. Spherical surface bodies 7, 9 fit into the depression in the slide 2 and are secured to the slide 2 with bolt 26. Then, gib 24 is secured to the frame 1. Next, the wedge 12, gib 33, and gib 25 are assembled. The positioning of gib 33, gib 25, and the wedge 12 are adjusted with the hollow screws 15 and bolt 16 while preserving the contact between the liner 11 and the cap 18. Bolt 17 secures the wedge 12 and gib 33 to the frame 1, and bolt 32 secures gib 25 to the frame 1.

The surfaces of the liners 11 are adhesed to gib 33 and are positioned to form an angle α as shown in FIG. 11. Spherical surface body 7 and the cap 18 transfer pressure from the slide 2 to the section of the surface of the liner 11 that contacts the flat section of the cap 18.

The force applied to the contact surfaces can be considered as separate lateral and longitudinal forces that restrict the slide 2 since the contact surfaces are inclined. Therefore, the slide 2 is restricted both laterally and longitudinally by the gib 33. The angle α is approximately 120° and is determined from the status of the eccentric load of the press. The lateral projected area is larger than the longitudinal projected area when the lateral eccentric load is greater than the longitudinal eccentric load. If α is 120°, the projected area ratio between the lateral projected area and the longitudinal projected area is $\sqrt{3}:1$, i.e., approximately 1.7:1.

FIGS. 8 and 9 show the liners 11, which serve as a pair of guide surfaces, positioned facing the center of the slide 2 so that the slide 2 forms a concave angle. However, the slide 2 forms a convex angle in the alternate embodiment shown in FIGS. 10 and 11. However, the structure shown in FIGS. 8 and 9 can adjust to the effects of increasing temperature or the like in the slide 2. The slide 2 expands when the temperature of the slide 2 increases relative to the gibs. The deformation of the slide 2 can be accommodated more easily when the slide 2 is formed with a concave angle as in FIGS. 8 and 9.

The surface contacts are formed between the spherical surface bodies and the gibs or between the caps and the gibs. Forming spherical contact surfaces prevents scorching and galling. The pressing operation is precise since the clearance for the gib is negligible, and the die guideposts do not have to be especially sturdy. Furthermore, the operation of the slide is simpler when using a component that engages with the spherical surface body.

The present invention is not limited to the embodiments described above with reference to the accompanying drawings. Various changes and modifications may be effected therein by one skilled in the art without departing from the scope or spirit of the invention as defined in the appended claims.

What is claimed is:

1. A slide guide for a press, said slide guide device comprising:
   a pair of gibs disposed on a frame of said press;
   a pair of spherical surface bodies having a flat surface adapted to slide against said gibs and each having a convex spherical surface; and
   a holder secured to a slide of said press and having a concave spherical surface section engaging with said convex spherical surface section of said spherical surface body,
   wherein each spherical surface body comprises a single flat surface contacting one of the gibs, and
   wherein the corresponding flat surfaces of the spherical surface bodies form one of a predetermined convex and concave angle.

2. A slide guide for a press as described in claim 1, wherein said holder is located in a depression on said slide.

3. A slide guide for a press, said slide guide device comprising:
   a gib disposed on a frame of said press;
   a cap having a flat surface adapted to slide against said gib and having a concave spherical surface; and
   a spherical surface body attached to a slide of said press and having a convex spherical surface section engaging with said concave spherical surface section of said cap.

4. A slide guide for a press as described in claim 3, wherein a pair of said spherical surface bodies are positioned at one of a predetermined convex and concave angle to said gib.

5. A slide guide for a press as described in claim 4, wherein said spherical surface body is located in a depression on said slide.

6. A slide guide for a press as described in claim 3, wherein said spherical surface body is located in a depression on said slide.

7. A slide guide for a press as described in claim 1, wherein the single flat surface of each spherical surface body contacting one of the gibs is positioned at one of a predetermined convex and concave angle to a surface of the gib facing the frame.

8. A slide guide for a press, said slide guide device comprising:
   a gib disposed on a frame of said press;
   a spherical surface body having a flat surface adapted to slide against said gib and having a convex spherical surface; and
   a holder secured to a slide of said press and having a concave spherical surface section engaging with said convex spherical surface section of said spherical surface body,
   wherein the spherical surface body comprises a single flat surface contacting the gib, and
   wherein the flat surface of the spherical surface body forms an acute angle with a surface of the gib facing the frame.

9. A slide guide for a press as described in claim 8, further comprising a second spherical surface body having a flat surface adapted to slide against said gib and having a convex spherical surface.

10. A slide guide for a press as described in claim 9, wherein the corresponding flat surfaces of the spherical surface bodies form one of a predetermined convex and concave angle.

11. A slide guide for a press as described in claim 8, wherein the single flat surface of each spherical surface body is positioned at one of a predetermined convex and concave angle to a surface of the gib facing the frame.

* * * * *